United States Patent [19]

Bugenov et al.

[11] Patent Number: 4,780,296
[45] Date of Patent: Oct. 25, 1988

[54] PROCESS FOR PRODUCING PHOSPHORUS

[75] Inventors: Erken S. Bugenov; Shayakhmet Moldabekov; Leonid M. Volozhin; Vladimir G. Prikhodko; Larion A. Ashkinazi; Vladimir P. Puchkov, all of Chimkent; Tuiganbek Temirbekov; Klim A. Kim, both of Dzhambul; Alfia K. Gaifullina, Chimkent, all of U.S.S.R.

[73] Assignee: Kazakhsky Khimiko-Tekhnologichesky Institut, Chimkent, U.S.S.R.

[21] Appl. No.: 55,170

[22] Filed: May 28, 1987

[51] Int. Cl.$^4$ ................................ C01B 25/02
[52] U.S. Cl. .................................... 423/323
[58] Field of Search ........................ 423/323

[56] References Cited

U.S. PATENT DOCUMENTS

| 3,052,523 | 9/1962 | Loudon et al. | 423/323 |
| 3,056,659 | 10/1962 | Yarze et al. | 423/323 |
| 3,118,734 | 1/1964 | Miles et al. | 423/323 |
| 3,481,706 | 12/1969 | Veltman et al. | 423/323 |
| 3,679,363 | 7/1972 | Skrivan | 423/323 |

FOREIGN PATENT DOCUMENTS

| 2014014 | 10/1971 | Fed. Rep. of Germany | 423/323 |
| 257917 | 6/1927 | United Kingdom | 423/323 |
| 356038 | 9/1931 | United Kingdom | 423/323 |
| 2523092 | 2/1970 | U.S.S.R. | 423/323 |
| 521222 | 11/1976 | U.S.S.R. | 423/323 |
| 742376 | 6/1980 | U.S.S.R. | 423/323 |
| 808362 | 3/1981 | U.S.S.R. | 423/323 |
| 859289 | 8/1981 | U.S.S.R. | 423/323 |
| 947038 | 7/1982 | U.S.S.R. | 423/323 |
| 1017670 | 5/1983 | U.S.S.R. | 423/323 |

*Primary Examiner*—John Doll
*Assistant Examiner*—Wayne A. Langel
*Attorney, Agent, or Firm*—Burgess, Ryan and Wayne

[57] ABSTRACT

A process for producing phosphorus, which comprises supplying a phosphorite ore to melting simultaneously with feeding paraffin or higher fatty acids $C_{20}-C_{24}$, melting the phosphorite ore in the presence of a reducing agent and quartzite with the formation of flue gases containing vapours of phosphorus. The flue gases are subjected to cleaning and condensation with the recovery of phosphorus and the formation of a slime. The slime is subjected to extraction with paraffin or higher fatty acids $C_{16}-C_{24}$ to recover phosphorus therefrom.

5 Claims, No Drawings

PROCESS FOR PRODUCING PHOSPHORUS

FIELD OF THE INVENTION

The present invention relates to the production of phosphorus and compounds thereof and, more specifically, to a process for producing phosphorus, which is useful in the production of phosphoric acid and commercial phosphates.

BACKGROUND OF THE INVENTION

Known in the art is a process for producing phosphorus from flue gases containing vapours of phosphorus, carbon monoxide, gaseous compounds of fluorine and silicon, fine dust, by treating thereof at a temperature of from 130° to 350° C. with steam supplied in an amount of 10 to 100 g per m$^3$ of the gas, followed by condensation of the gases with water to recover phosphorus and produce a slime. The slime into which there passes up to 12% of phosphorus, as calculated for the mass of phosphorus produced, is delivered to further processing (SU, A, No. 1017670.)

This prior art process is noted for a considerable slime formation, but the recovery of phosphorus from such slimes is hindered due to the presence of asphalt-resin stabilizers therein.

Also known is a process for producing phosphorus, comprising melting of a phosphorite ore (phosphate rock) in the presence of a reducing agent (coke) and quartzite with the formation of flue gases containing vapours of phosphorus, outdusting thereof in electric filters and condensation with water to recover phosphorus and a slime. The latter is delivered to reprocessing to obtain phosphorus (SU, A, No. 981211). The flue gases prior to the condensation are treated with vapours or an emulsion of an organosilicon liquid such as polymethylsiloxane.

In carrying out this process 10% of phosphorus by mass of the produced phosphorus passes into the slime which has an increased content of asphalt-resin substances.

Furthermore, the employed organosilicon liquids are hardly available and hazardous, so that commercial implementation of the process becomes rather difficult.

From the slimes obtained in the above-described processes it is difficult to recover phosphorus due to a considerable stabilization of phosphorus particles therein by asphalt-resin substances. They are usually subjected to an extraction with organic agents such as carbon tetrachloride in the presence of various oxidizing agents (SU, A, No. 856976). The degree of recovery of phosphorus from such slimes is not more than 70%. Furthermore, the extraction is carried out at a mass ratio of the extraction agent to the slime of 8–10:1, so that the process in general is complicated. Hydrolysis of the extraction agent results in the formation of hydrochloric acid which has a detrimental effect on the corrosion-resistance of the equipment.

SUMMARY OF THE INVENTION

It is an object of the present invention to provide a process for producing phosphorus, which would enable a maximum yield of commercial phosphorus.

This object is accomplished by the provision of a process for producing phosphorus, comprising melting a phosphorite ore in the presence of a reducing agent and quartzite with the formation of flue gases containing vapours of phosphorus, purification thereof and condensation with water to recover phosphorus and to obtain a slime, followed by recovery of phosphorus from the latter by means of an organic extraction agent, wherein, according to the present invention, in the supply of the phosphorite ore to melting, paraffin or higher fatty acids $C_{20}$–$C_{24}$ is/are also supplied and as the organic extraction agent for the recovery of phosphorus from the slime use is made of paraffin or higher fatty acids $C_{16}$–$C_{24}$.

The reagents introduced into the process perform a dual function. First of all, they contribute to minimization of the slime-formation and provide conditions for the formation of stabilized slimes due to decomposition of asphalt-resin substances in the gas phase. The use of such reagents makes it possible to increase the yield of phosphorus from the gas phase into a commercial product up to 94–99% and lower the passage of phosphorus into the slime down to 5% based on the mass of the phosphorus produced. They also act as extraction agents and, when used in the treatment of slightly-stabilized slimes, ensure a maximum yield of commercial phosphorus (up to 99.6%). To create favourable conditions for condensation of the flue gases and minimize the slime formation, it is advisable to carry out the supply of the paraffin in an amount of 0.05 to 0.2% by mass of the supplied phosphorite ore, while the higher fatty acids $C_{20}$–$C_{24}$ should be supplied in an amount of from 0.05 to 0.3% by mass of the supplied phosphorite ore.

To ensure a maximum recovery of phosphorus from the resulting slime, it is preferable to extract it with paraffin at a mass ratio of from 1:1 to 1:4 or with higher fatty acids $C_{16}$–$C_{24}$ at a mass ratio of 1:1 to 1:2.

DETAILED DESCRIPTION OF THE INVENTION

The process according to the present invention is carried out in the following manner.

A charge containing a phosphorite ore, a reducing agent (coke) and quartzite is fed into a continuous-action furnace wherein it is melted at the temperature of 1,500° C. At the same time, molten paraffin is supplied into the furnace through nozzles at a rate of 0.05–0.2% by mass of the phosphorite ore, or molten fatty acids $C_{20}$–$C_{24}$ at a rate of 0.05 to 0.3% by mass of the phosphorite ore, which reagents are deposited on the charge surface. The supply of paraffin or higher fatty acids can be also effected in a mixture with the charge.

As the charge moves to the melting zone, it is heated by the flow of the resulting flue gases, ascending from this zone and containing vapours of phosphorus, carbon monoxide, gaseous compounds of fluorine and silicon, and fine dust. In the furnace zone with a temperature of 350° to 500° C. paraffin or the higher fatty acids are evaporated from the surface of the charge and pass, together with the flue gases, onto electric filters via a gas duct.

The charge, while moving to the zone located at the bottom part of the furnace, is melted at the temperature of 1,500° C. This results in the formation of flue gases containing vapours of phosphorus, carbon monoxide, fluorine and silicon compounds, fine dust, as well as slag and ferrophosphorus. The flow of the resulting gases moves countercurrently to the charge movement.

As the temperature of the flue gases becomes lower than the dew point (300° C.) of the paraffin vapours or of the vapours of higher fatty acids $C_{20}$–$C_{24}$, the latter ensure blocking of the active centres of fine dust, so that its coagulation occurs. This dust contains asphalt-resin substances contributing to the highest degree of stabilization of the slimes formed later on. These substances are decomposed by the paraffin or the above-mentioned higher fatty acids before reaching the stage of condensation. At the same time, the paraffin or higher fatty acids do not react with phosphorus, since at these temperatures it is in the gas state.

Owing to such an effect of paraffin or higher fatty acids $C_{20}$–$C_{24}$ the coagulated dust is substantially fully captured by the electric filter. After the filter the cleaned flue gases are fed to condensation effected by way of spraying them with water. On the bottom of the condensation bath a layer of relatively pure commercial phosphorus is accumulated in an amount of more than 94% of its mass in the gas phase. Over this layer there is a mixture referred to as a slime, consisting of droplets or globules of phosphorus, solid impurities, and water. According to the process of this invention, up to 5% of the entire mass of the phosphorus produced apasses into this slime, this being 2–4 times lesser than in the prior art processes. Along with the reduction of the amount of the slime, it also has a low degree of stabilization due to the presence of low-molecular hydrocarbons therein. The low-molecular hydrocarbons are well-extracted by paraffin or fatty acids $C_{16}$–$C_{24}$. For this reason they were suggested for use as an extraction agent for the recovery of phosphorus from the slime produced in the process of the present invention. It is desirable to extract the slime with paraffin at a mass ratio of 1:1 to 1:4, or with higher fatty acids at a mass ratio of 1:1 to 1:2. This will enable a yield of commercial phosphorus in the extraction as high as up to 99.6%.

EXAMPLE 1

Into a continuous-action furnace 29.0 t of a charge consisting of 20 t of a phosphorite ore, 4 t of quartzite, and 5.0 t of coke are loaded, Simultaneously through nozzles a molten paraffin is sprayed into the furnace at the rate of 0.05% by mass of the phosphorite ore which is deposited on the surface of the charge. As the latter moves to the melting zone it is heated by a flow of ascending flue gases formed earlier. At the temperature of 350° C. evaporation of paraffin occurs. The resulting vapours are mixed with the flue gases and delivered to purification and condensation. The charge, while passing into the zone located in the bottom section of the furnace, gets molten at the temperature of 1,500° C. This results in the formation of flue gass containing vapours of phosphorus, carbon monoxide, fluorine and silicon compounds, fine dust, as well as slag and ferrophosphorus. The flow of the resulting flue gases is directed countercurrently to the charge movement.

The flue gases in a mixture with the paraffin vapours are cleaned in an electric filter, and then they are delivered to condensation. At the bottom part of the condensation bath 1.9 t of commercial phosphorus are accumulated. The upper layer comprises a slime into which 0.1 t of phosphorus passes. The yield of commercial phosphorus amounts to 95% of its mass in the gas phase. The mass of the formed slime is 0.2 t. 0.2 t of the slime is extracted with 0.4 t of molten paraffin, i.e. at the mass ratio of 1:2, at the temperature of 70° C.

The yield of the commercial phosphorus from the slime is 99.4% by mass.

EXAMPLE 2

Into a continuous-action furnace 29.0 t of a charge consisting of 20 t of a phosphorite ore, 4 t of quartzite and 5.0 t of coke are loaded. Simultaneously molten paraffin is sprayed into the furnace through nozzles at the ratio of 0.2% by mass of the phosphorite ore, which paraffin settles on the surface of the charge. As the charge moves to the melting zone, it is heated by a flow of ascending flue gases formed earlier. The paraffin evaporates at the temperature of 300° C. The resulting vapours are mixed with the flue gases and delivered to cleaning and condensation. The charge, while passing into the zone of the bottom part of the furnace, melts at the temperature of 1,500° C. This results in the formation of flue gases containing vapours of phosphorus, carbon monoxide, compounds of fluorine and silicon, fine dust, as well as slag and ferrophosphorus. The flow of the resulting flue gases moves countercurrently to the charge movement.

The cleaning of the flue gases mixed with the paraffin vapours is effected in an electric filter, whereafter they are subjected to condensation. In the lower part of the condensation bath 1.99 t of phosphorus are accumulated. The yield of commercial phosphorus is 99.5% of its mass in the gas phase. The upper layer comprises a slime into which 0.01 t of phosphorus passes. The mass of the obtained slime is 0.02 t. 0.02 t of the slime is subjected to extraction with 0.02 t of molten paraffin, i.e. at the mass ratio of 1:1, at the temperature of 60° C.

The yield of commercial phosphorus from the slime is 95.5% by mass.

EXAMPLE 3

Into a continuous-action furnace 29.0 t of a charge consisting of 20 t of a phosphorite ore, 4 t of quartzite, and 5.0 t of coke are loaded. Simultaneously molten higher fatty acids $C_{20}$–$C_{24}$ are sprayed into the furnace through nozzles at the rate of 0.3% by mass of the phosphorite ore, which acids settle on the surface of the charge. As the charge moves towards the melting zone, it is heated by a flow of ascending flue gases formed earlier. At the temperature of 400° C. the fatty acids are evaporated. The resulting vapours are mixed with the flue gases and fed to cleaning and condensation. The charge, while passing into the zone located at the bottom of the furnace is melted at the temperature of 1,500° C. Flue gases are thus formed, which contain vapours of phosphorus, carbon monoxide, compounds of fluorine and silicon, fine dust, as well as slag and ferrophosphorus. The flow of the resulting flue gases moves countercurrently to the charge movement.

Cleaning of the flue gases mixed with the vapours of higher fatty acids is effected in an electric filter, followed by their condensation. 1.98 t of commercial phosphorus are accumulated at the bottom section of the condensation bath.

The yield of commercial phosphorus is 99% of its mass in the gas phase. The upper layer comprises a slime whereinto 0.2 t of phosphorus passes. The slime mass is 0.04 t. 0.04 t of the slime is subjected to extraction with 0.04 t of molten higher fatty acids $C_{16}$–$C_{24}$, i.e. at their mass ratio of 1:1, at the temperature of 70° C.

The yield of commercial phosphorus from the slime is 95.0% by mass.

EXAMPLE 4

Into a continuous-action furnace 29.0 t of a charge consisting of 20 t of a phosphorite ore, 4 t of quartzite, and 5.0 t of coke are charged. Simultaneously molten higher fatty acids $C_{20}$–$C_{24}$ are sprayed into the furnace through nozzles at the rate of 0.5% by mass of the phosphorite ore, which acids settle on the surface of the charge. As the charge moves towards the melting zone, it is heated by a flow of ascending flue gases formed earlier. The fatty acids evaporate at the temperature of 500° C. The resulting vapours are mixed with the flue gases and delivered to cleaning and condensation. The charge, while passing into the zone located in the bottom part of the furnace, is melted at the temperature of 1,500° C. This results in the formation of flue gases containing vapours of phosphorus, carbon monoxide, fluorine and silicon compounds, fine dust, as well as slag and ferrophosphorus. The flow of the resulting flue gases moves countercurrently to the charge movement.

The cleaning of the flue gases in a mixture with vapours of the higher fatty acids is effected in an electric filter, whereafter they are subjected to condensation. In the bottom section of the condensation bath 1.88 t of commercial phosphorus are accumulated. The yield of commercial phosphorus is 94% of its mass in the gas phase.

The upper layer comprises a slime, whereinto 0.12 t of phosphorus pass. The mass of the resulting slime is 0.24 t. 0.24 t of the slime is subjected to extraction with 0.48 t of molten higher fatty acids $C_{16}$–$C_{24}$, i.e. at their mass ratio of 1:2, at the temperature of 60° C.

The yield of commercial phosphorus from the slime is 99.6% by mass.

EXAMPLE 5

Into a continuous-action furnace 29.0 t of a charge consisting of 20 t of a phosphorite ore, 4 t of quartzite and 5.0 t of coke are loaded. Simultaneously molten paraffin is sprayed into the furnace through nozzles at the rate of 0.1% by mass of the phosphorite ore, which paraffin settles on the surface of the charge. As the charge gets moving towards the melting zone it is heated with a flow of flue gases formed earlier. As the temperature of 350° C. the paraffin evaporates. The resulting vapours are mixed with the flue gases and delivered to cleaning and condensation. The charge passing into the zone located in the bottom section of the furnace melts at the temperature of 1,500° C. This results in the formation of flue gases containing vapours of phosphorus, a mixture of carbon, fluorine, and silicon compounds, fine dust, as well as slag and ferrophosphorus. The flow of the formed flue gases moves countercurrently to the charge movement.

The cleaning of the flue gases mixed with the paraffin vapours is effected in an electric filter, whereafter they are subjected to condensation. In the lower section of the condensation bath 1.94 t of commercial phosphorus are accumulated. The yield of the phosphorus produced is 97% of its mass in the gas phase. The upper layer comprises a slime, whereinto 0.06 t of phosphorus passes. The mass of the resulting slime is 0.12 t. 0.12 t of the slime is subjected to extraction with 0.24 t of molten higher fatty acids $C_{16}$–$C_{24}$, i.e. at the mass ratio thereof of 1:2, at the temperature of 60° C.

The yield of commercial phosphorus from the slime is equal to 99.6% by mass.

What is claimed is:

1. A process for producing phosphorus comprising:
   supplying a phosphorite ore to melting simultaneously with feeding molten paraffin or molten higher fatty acids $C_{20}$–$C_{24}$;
   melting of the phosphorite ore in the presence of a reducing agent and quartzite with the formation of flue gases containing vapours of phosphorus;
   cleaning of the flue gases and condensation thereof with water to recover phosphorus with the formation of a slime;
   recovering phosphorus from the slime by treatment thereof with an organic extraction agent selected from the group consisting of molten paraffin and molten higher fatty acids $C_{16}$–$C_{24}$.

2. A process as claimed in claim 1, wherein the supply of molten paraffin is effected in an amount of 0.05 to 0.2% by mass of the supplied phosphorite ore.

3. A process as claimed in claim 1, wherein the supply of molten higher fatty acids $C_{20}$–$C_{24}$ is effected in an amount of 0.05 to 0.3% by mass of the supplied phosphorite ore.

4. A process as claimed in claim 1, wherein for the recovery of phosphorus the slime is subjected to extraction with molten paraffin at a mass ratio thereof of 1:1–4.

5. A process as claimed in claim 1, wherein for the recovery of phosphorus the slime is extracted with molten higher fatty acids $C_{16}$–$C_{24}$ at a mass ratio thereof of 1:1–2.

* * * * *